United States Patent [19]

Kyo et al.

[11] 4,123,420

[45] Oct. 31, 1978

[54] AROMATIC COPOLYESTER COMPOSITION CONTAINING PHOSPHORUS COMPOUNDS

[75] Inventors: Kayomon Kyo, kyoto; Yasuhiko Asai, Uji; Shinichi Tokumitsu, Uji, all of Japan

[73] Assignee: Unitika Ltd., Amagasaki, Japan

[21] Appl. No.: 846,670

[22] Filed: Oct. 28, 1977

[51] Int. Cl.² ............................................. C08G 63/68
[52] U.S. Cl. ................................ 528/127; 260/45.7 P; 260/860; 260/873; 260/DIG. 24; 528/167; 528/169
[58] Field of Search ...................... 260/47 P, 47 C, 49, 260/45.7 P, 860, 873, DIG. 24

[56] References Cited

U.S. PATENT DOCUMENTS

| | | | |
|---|---|---|---|
| 3,956,431 | 5/1976 | Honig et al. | 260/971 |
| 4,028,330 | 6/1977 | King | 260/45.7 P |
| 4,035,442 | 7/1977 | Dunworth | 260/860 |

Primary Examiner—Lester L. Lee
Attorney, Agent, or Firm—Sughrue, Rothwell, Mion, Zinn and Macpeak

[57] ABSTRACT

An aromatic copolyester composition comprising (A) an aromatic copolyester derived from terephthalic acid, isophthalic acid and a bisphenol and (B) a phosphorus-containing compound represented by the general formula (II)

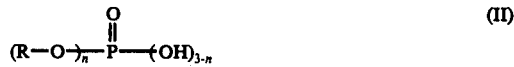

$$(R-O)_n-\overset{O}{\underset{\|}{P}}-(OH)_{3-n} \quad (II)$$

wherein $n$ is 0 or an integer of 1 to 3, and R is an alkyl group containing 1 to 18 carbon atoms, in which one or more of the hydrogen atoms of the alkyl group may be replaced by a halogen atom or a hydrocarbon group.

Molded products obtained from the aromatic copolyester composition have markedly reduced coloration and reduced occurrence of water crazing.

19 Claims, No Drawings

AROMATIC COPOLYESTER COMPOSITION CONTAINING PHOSPHORUS COMPOUNDS

BACKGROUND OF THE INVENTION

1. Field of the Invention

This invention relates to a stabilized aromatic copolyester composition, more specifically, to a stabilized aromatic copolyester composition including a phosphorus-containing compound.

2. Description of the Prior Art

The aromatic copolyester used in this invention is obtained from a mixture of terephthalic acid and/or functional derivatives thereof and isophthalic acid and/or functional derivatives thereof (with the terephthalic acid/isophthalic acid unit mole ratio being about 9:1 to about 1:9) and a bisphenol of the following general formula (I)

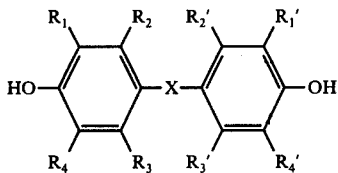

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$ and $R_4'$, which may be the same or different, each represents a member selected from the group consisting of a hydrogen atom, a chlorine atom, a bromine atom and an alkyl group containing 1 to 4 carbon atoms, or functional derivatives thereof.

Known methods for producing such an aromatic copolyester include, for example, an interfacial polymerization method which involves mixing an aromatic dicarboxylic acid chloride dissolved in a water-immiscible organic solvent with an alkaline aqueous solution of a bisphenol, a solution polymerization method which comprises heating a bisphenol and an acid chloride in an organic solvent, and a melt polymerization method which comprises heating a phenyl ester of an aromatic dicarboxylic acid and a bisphenol, e.g., as disclosed in U.S. Pat. Nos. 3,884,990 and 3,946,091.

It is also known that aromatic copolyesters derived from aromatic dicarboxylic acids and bisphenols have superior properties to polyesters derived from aromatic dicarboxylic acids and aliphatic alkylene glycols. Specifically, these copolyesters have many superior characteristics, e.g., mechanical properties such as tensile strength, elongation, flexural strength, flexural recovery and impact strength, heat-distortion temperature, dimensional stability, electrical properties, and fire retardancy. Because of these superior properties, these copolyesters are known to be useful in a wide range of fields as various molded articles, films, fibers, and coating materials obtained by extrusion molding, injection molding, etc.

The aromatic copolyesters obtained by the above methods frequently assume yellow or brown colors in their as-prepared state. It is also noted that aromatic copolyesters turn yellow when heated during injection molding, extrusion molding and other shaping operations which are used to form ordinary molded products or films. Such coloration is extremely inconvenient when a lack of color in the resulting molded articles is important. Furthermore, when a pigment is incorporated into a molding composition to obtain a desired color, the color of the final product frequently is quite different from the desired color when the molding composition is colored.

The aromatic copolyesters used in this invention have a high heat distortion temperature, and therefore, are frequently used under high temperature conditions. The above-described coloration, however, proceeds generally under high temperature conditions and impairs the transparency of the molded product. Consequently, such a product cannot be used in applications which require transparency and a lack of color at high temperatures.

Such a coloration is also considered to occur with the decomposition of the polymer. Thus, coloration causes an irregular reduction in the logarithmic viscosity number of the polymers constituting the molded articles and deteriorates the useful properties of these polymers. Coloration is therefore extremely disadvantageous in obtaining products which are uniform. The techniques known to obviate this problem are the addition of sodium dithionite (e.g., as disclosed in Japanese Patent Publication No. 11297/63) of polyphenylene or active anthracene (e.g., as disclosed in Japanese Patent Publication No. 23418/70). These methods, however, do not produce entirely satisfactory results when applied to the aromatic copolyesters having high processing temperatures as used in this invention.

Compounds of the naphthylamine, diphenylamine, ethylenediamine, and aromatic amine types are used as antioxidants for rubbers. When used as antioxidants for plastics, these amine type compounds can reduce the decomposition of plastics, but, unfortunately, they also degrade their color. Hence, the resulting molded articles are heavily colored. Further, organotin mercaptide compounds as disclosed in Japanese Patent Application (OPI) No. 51048/73, various kinds of acid anhydrides as disclosed in Japanese Patent Application (OPI) No. 23254/74, epoxy compounds as disclosed in Japanese Patent Application (OPI) No. 22754/76 or of a phosphite compound (e.g., as disclosed in Japanese Patent Application (OPI) No. 16558/77, corresponding to U.S. patent application Ser. No. 110,050, filed July 30, 1976 and the like are known as a coloration preventing agents for aromatic copolyesters.

Aromatic copolyesters also have the serious defect that when molded products made therefrom are allowed to stand for long periods of time in hot water or steam, water crazing occurs. Water crazing is a phenomenon whereby a clouding or a network of fine cracks appears on the surface of in the interior of molded articles, and this phenomenon has been reported in the literature and elsewhere. Water crazing occurs wholly or partly in molded articles of aromatic copolyesters upon treatment in hot water or steam. The occurrence of water crazing not only causes a loss of the transparency of the molded articles, but also renders them brittle. As a result, the impact strength and break elongation are reduced, and the molded articles easily break under a bending stress or an impact force.

Some methods are known in the art for preventing water crazing in aromatic copolyester molded articles. Among these methods is a method in which polyethylene terephthalate is mixed with the aromatic copolyester and the mixture is melted and formed into molded articles (e.g., as disclosed in U.S. Pat. No. 3,946,091), and a method in which polyethylene-p-hydroxybenzoate is added to the aromatic copolyester (e.g., as disclosed in U.S. Pat. No. 3,884,990).

These methods are effective for preventing the occurrence of water crazing (referred to hereinbelow simply as "crazing") but do not produce an effect of stabilizing polymers to heat and improve their color.

SUMMARY OF THE INVENTION

A first object of this invention is to provide an aromatic copolyester composition that is stabilized against heat and which can be used to produce molded articles which are free from coloration and which do not develop coloration even in use at high temperatures.

A second object of the invention is to provide an aromatic copolyester composition which is stabilized against hot water and where crazing does not occur in molded articles produced therefrom even in steam or hot water.

Extensive investigations have been made in order to remove the defects of aromatic copolyesters described above. These investigations led to the discovery that the above-described undesirable coloration or heat decomposition and crazing of aromatic copolyesters can be markedly reduced by adding specified amounts of at least one specified phosphorus-containing compound to the aromatic copolyester and very stable aromatic copolyester compositions are provided.

The present invention thus provides an aromatic copolyester composition which comprises (A) an aromatic copolyester derived from (a) a mixture of terephthalic acid and/or a functional derivative thereof and isophthalic acid and/or a functional derivative thereof with the terephthalic acid unit/isophthalic acid unit mole ratio being about 9:1 to about 1:9 and (b) a bisphenol of the general formula (I)

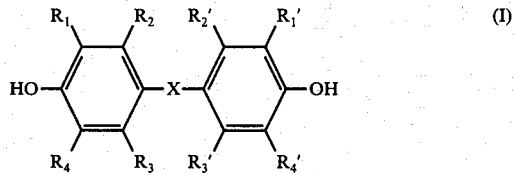

wherein —X— is a member selected from the group consisting of —O—, —S—, —SO$_2$—, —SO—, —CO—, an alkylene group containing 1 to 4 carbon atoms, and an alkylidene group containing 1 to 4 carbon atoms, and each of $R_1$, $R_2$, $R_3$, $R_4$, $R_1'$, $R_2'$, $R_3'$ and $R_4'$, which may be the same or different, is a member selected from the group consisting of a hydrogen atom, a chlorine atom, a bromine atom and an alkyl group containing 1 to 4 carbon atoms, or a functional derivative thereof and (B) about 0.01 to less than about 2% by weight, based on the aromatic copolyester (A), of at least one phosphorus-containing compound of the general formula (II)

wherein $n$ is 0 or an integer of 1 to 3, and R is an alkyl group containing 1 to 18 carbon atoms, in which one or more of the hydrogen atoms of the alkyl group may be replaced by a halogen atom or a hydrocarbon group.

DETAILED DESCRIPTION OF THE INVENTION

Molded products made from the aromatic copolyester composition of this invention have markedly reduced coloration, and, even when exposed to high-temperature conditions, the molded products develop little coloration and show good stability to heat. Furthermore, even in hot water or in contact with steam, crazing in these molded products is reduced, and the molded products retain good dynamic properties and transparency.

The aromatic copolyester used in this invention is obtained from a mixture of terephthalic acid and isophthalic acid and/or functional derivatives thereof (the terephthalic acid unit/isophthalic acid unit mole ratio being about 9:1 to about 1:9) and a bisphenol of the following general formula (I)

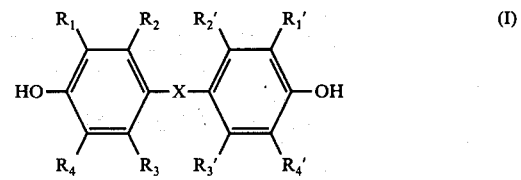

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$ and $R_4'$, which may be the same or different, each is selected from the group consisting of a hydrogen atom, a chlorine atom, a bromine atom and an alkyl group containing 1 to 4 carbon atoms, or a functional derivative thereof.

A mixture of about 90 to about 10 mole% of terephthalic acid and/or a functional derivative thereof and about 10 to about 90 mole% of isophthalic acid and/or a functional derivative thereof is used as an acid component to be reacted with the bisphenol to prepare the aromatic copolyester as referred to in this invention. Preferably, a mixture of 30 to 70 mole% of terephthalic acid and/or a functional derivative thereof and 70 to 30 mole% of isophthalic acid and/or a functional derivative thereof is used. Aromatic copolyesters prepared from the bisphenol and a mixture of 50 mole% of terephthalic acid and/or a functional derivative thereof and 50 mole% of isophthalic acid and/or a functional derivative thereof is most preferred. The molar ratio of the bisphenol to the sum of the terephthalic acid units and isophthalic acid units is substantially equimolar.

Suitable functional derivatives of terephthalic or isophthalic acid which can be used include acid halides, dialkyl esters and diaryl esters. Preferred examples of acid halides include terephthaloyl dichloride, isophthaloyl dichloride, terephthaloyl dibromide and isophthaloyl dibromide. Preferred examples of dialkyl esters include dialkyl esters of terephthalic and isophthalic acids containing 1 to 6 (especially 1 to 2) carbon atoms in each alkyl moiety thereof. Preferred examples of diaryl esters include diphenyl terephthalate and diphenyl isophthalate.

Examples of suitable bisphenols of the general furmula (I) above are 4,4'-dihydroxy-diphenyl ether, bis(4-hydroxy-2-methylphenyl) ether, bis(4-hydroxy-3-chlorophenyl) ether, bis(4-hydroxyphenyl) sulfide, bis(4-hydroxyphenyl) sulfone, bis(4-hydroxyphenyl)

ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)methane, 1,1-bis(4'-hydroxyphenyl)ethane, 2,2-bis(4'-hydroxy-3'-methylphenyl)propane, 2,2-bis(4'-hydroxy-3'-chlorophenyl)propane, 2,2-bis(4'-hydroxy-3', 5'-dichlorophenyl)propane, 2,2-bis(4'-hydroxy-3',5'-dibromophenyl)propane, and 1,1-bis(4'-hydroxyphenyl)-n-butane. 2,2-bis(4'-Hydroxyphenyl)propane, bisphenol A, is most typical and is readily available, and, accordingly, is most often used.

Typical examples of functional derivatives of bisphenols which can be used are the metal salts thereof and the diesters thereof with aliphatic monocarboxylic acids containing 1 to 3 carbon atoms. Preferred functional derivatives of the bisphenols are the sodium salts, the potassium salts, and the diacetate esters thereof. The bisphenols may be used either alone or as a mixture of two or more thereof.

To produce these aromatic copolyesters, the interfacial polymerization method which comprises mixing a solution of an aromatic dicarboxylic acid chloride in a water-immiscible organic solvent with an alkaline aqueous solution of bisphenol, the solution polymerization method which comprises heating a bisphenol and an acid chloride in an organic solvent, and the melt polymerization method which comprises heating a phenyl ester of an aromatic dicarboxylic acid and bisphenol, which are described in detail in U.S. Pat. Nos. 3,884,990, and 3,946,091, can, for example, be employed.

In order to insure the aromatic copolyesters used in this invention have good physical properties they should have a logarithmic viscosity number ($\eta_{inh}$), defined by the following relationship, of about 0.3 to about 1.0, preferably 0.4 to 0.8, $$\eta_{inh} = (\log_e t_1/t_2)/C$$

wherein $t_1$ is the falling time (in seconds) of a solution of the aromatic copolyester in a solvent; $t_2$ is the falling time (in seconds) of the solvent; and $C$ is the concentration (in g/dl) of the aromatic copolyester in the solution. The logarithmic viscosity number, as used herein, is determined in a 1,1,2,2-tetrachloroethane-phenol mixture (weight ratio: 4/6) at 25° C.

Any of the interfacial polymerization method, solution polymerization method and melt polymerization method described above can be used to produce the aromatic copolyesters used in this invention. The use of the interfacial polymerization method which comprises mixing an organic solvent solution of terephthaloyl dichloride and isophthaloyl dichloride with an alkaline aqueous solution of the bisphenol with stirring is convenient because this method can be used to produce aromatic copolyesters with relatively little coloration.

The phosphorous containing compound used in the present invention is expressed by the general formula (II)

(II)

wherein $n$ is 0 or an integer of 1 to 3 and R is an alkyl group containing 1 to 18 carbon atoms in which one or more of the hydrogen atoms of the alkyl group may be replaced by a halogen atom or a hydrocarbon group. Suitable specific examples of phosphorus-containing compounds which can be used include orthophosphoric acid, monomethyl phosphate, dimethyl phosphate, trimethyl phosphate, monoethyl phosphate, diethyl phosphate, triethyl phosphate, monoisopropyl phosphate, diisopropyl phosphate, triisopropyl phosphate, monopropyl phosphate, dipropyl phosphate, tripropyl phosphate, monobutyl phosphate, dibutyl phosphate, tributyl phosphate, (dibutyl) (monoethyl) phosphate, mono-(2-ethylhexyl) phosphate, di(2-ethylhexyl) phosphate, tri-(2-ethylhexyl) phosphate, monooctyl phosphate, dioctyl phosphate, trioctyl phosphate, monoisodecyl phosphate, diisodecyl phosphate, triisodecyl phosphate, tris-(2,3-dichloropropyl) phosphate, monolauryl phosphate, dilauryl phosphate, trilauryl phosphate, monotridecyl phosphate, ditridecyl phosphate, tris-tridecyl phosphate, monostearyl phosphate, distearyl phosphate, tristearyl phosphate, mono-(2-chloroethyl) phosphate, bis-(2-chloroethyl) phosphate, tris-(2-chloroethyl) phosphate, mono(2-bromoethyl) phosphate, bis-(2-bromoethyl) phosphate, tris-(2-bromoethyl) phosphate, mono(3-chloropropyl) phosphate, bis-(3-chloropropyl) phosphate, tris-(3-chloropropyl) phosphate, mono-(3-bromopropyl) phosphate, bis-(3-bromopropyl) phosphate, tris-(3-bromopropyl) phosphate, mono-(2-methyl-3-chloropropyl) phosphate, bis-(2-methyl-3-chloropropyl) phosphate, mono-(1,2-dichloroethyl) phosphate, and bis-(1,2-dichloroethyl) phosphate. These phosphorus-containing compounds may be used individually or as a mixture thereof.

The use of alkyl phosphates or dialkyl phosphates of formula (II) in which $n$ is an integer of 1 or 2 and $R_1$ is an alkyl group of 1 to 10 carbon atoms, or mixtures of alkyl phosphates and dialkyl phosphate are most preferred because they can afford aromatic copolyester compositions having an especially good balance among color, heat stability, crazing resistance and dynamic properties.

The amount of the phosphorus-containing compound to be added to the aromatic copolyester differs according to the type of the phosphorus-containing compound used, but should be about 0.01 to less than about 2% by weight, preferably 0.02 to 1.0% by weight, especially preferably 0.05 to 0.5% by weight, based on the weight of the aromatic copolyester. If the amount of the phosphorus-containing compound is less than about 0.01% by weight, the effect of preventing coloration, heat decomposition and crazing is not sufficient, and if the amount of the phosphorus-containing compound exceeds about 2% by weight, the dynamic properties of the aromatic copolyester tend to be deteriorated.

Various methods can be used to add the phosphorus-containing compound to the aromatic copolyester. in the interfacial polymerization method in which a solution of a dicarboxylic acid chloride in an organic solvent and an alkaline aqueous solution of a bisphenol are stirred, the phosphorus-containing compound can be added to either one of the monomers prior to polymerization. When the polymerization product is isolated as a solution of the aromatic copolyester after the polymerization, a solution of the phosphorus-containing compound may be added to the aromatic copolyester solution. When the aromatic copolyester is isolated as a solid, the phosphorus-containing compound can of course be simply added to the aromatic copolyester. Furthermore, the phosphorus-containing compound may be incorporated in the aromatic copolyester by immersing the aromatic copolyester in a solution or suspension of the phosphorus-containing compound in a solvent such as methanol or acetone, and removing the solvent by evaporation after the immersion. In the case of melt polymerization, the phosphorus-containing compound may be fed together with the monomers at the time of polymerization. Alternatively, the phosphorus-containing compound may be added to chips or powders of the aromatic copolyester during a molding operation such as injection molding, extrusion molding, etc. If the phosphorus-containing compound is added to a powder or chips of the aromatic copolyester and the mixture is molded, molded articles having a uniform color and uniform characteristics can be obtained.

The aromatic copolyester composition of this invention may further contain various other additives such as antioxidants, ultraviolet absorbers, antistatic agents and fire retardants, as needed according to the purpose of use. For example, the effect of the present invention can be increased further by adding the phosphorus-containing compound in conjunction with an antioxidant. Examples of suitable antioxidants are conventional phenolic antioxidants, phosphite-type antioxidants, amine-type antioxidants, sulfur-containing compounds, organometallic compounds, and epoxy compounds. In addition, plasticizers, pigments and lubricants can also be incorporated in the aromatic copolyester composition of this invention. Alternatively the aromatic copolyester composition may be reinforced with glass fibers.

When an aromatic halogen compound such as decabromodiphenyl oxide is added to a resin composition to render the resin composition fire retardant, a molded article prepared from the composition frequently turns yellowish brown presumably due to heat decomposition. In such a case, too, the aromatic copolyester composition of this invention is stabilized against heat, and coloration is markedly prevented.

If desired, the aromatic copolyester composition of this invention may contain at least one additional polymer such as polyalkylene terephthalates (e.g., polyethylene terephthalate or polybutylene terephthalate), poly(ethylene oxybenzoate), polycarbonates, polyethylene, polypropylene, polyamides, polyurethanes, polystyrene, ABS resins, EVA copolymers, polyacrylates, polytetrafluoroethylene, polymethyl methacrylates, polyphenylene sulfide, and rubbers. In other words, a mixture of the aromatic copolyester and another polymer exemplified above can be used. The phosphorus-containing compound used in this invention exhibits a marked effect in this case, too.

A decrease in the degree of coloration or degradative decomposition of the aromatic copolyester composition of this invention occurs when such is exposed to heat during molding or used at high temperatures, and the aromatic copolyester composition of this invention is resistant to crazing even when exposed to hot water or steam.

Hence, the aromatic copolyester compositions of this invention can be used to form many useful articles employing generally known molding methods such as injection molding, extrusion molding or press molding. Typical examples of final products obtained by molding are films, monofilaments, and injection molded articles such as machine parts, automobile parts, electrical component parts, vessels and springs. The aromatic copolyester compositions of this invention also are particularly useful as engineering plastics for various application where the excellent properties of aromatic copolyesters are required.

The following examples are given to illustrate the present invention in more detail. It should be noted that the invention is in no way to be construed as being limited to these Examples. Unless otherwise indicated, all parts, percents, ratios and the like are by weight.

The logarithmic viscosity number ($\eta_{inh}$) given in these Examples is the value measured at 25° C using a mixture of phenol and tetrachloroethane (6:4 by weight) (C=1 g/dl).

The color of and the occurrence of crazing in the molded article were evaluated visually by the naked eye and rated as shown below. The evaluation of crazing was performed after allowing the molded article to stand at 80° C and RH 95% for 120 hours.

| Evaluation of Color | |
|---|---|
| Colorless | 1 |
| Pale yellow | 3 |
| Yellow | 5 |
| Light brown | 7 |
| Brown | 9 |
| Evaluation of Crazing | |
| No crazing | A |
| A slight crazing occurred | B |
| A small amount of crazing occurred | C |
| A medium amount of crazing occurred | D |
| A large amount of crazing occurred | E |

The Izod impact strength was measured in accordance with ASTM D256 using a notched sample with a width of ⅛ inch on an Izod impact tester.

The high temperature residence test was performed by allowing a sample to stand for 5 minutes at 380° C, then molding it with an injection molding machine, and evaluating the properties of the molded article obtained.

EXAMPLE I 450 kg of an aqueous sodium hydroxide solution having 22.5 kg of bisphenol A dissolved therein was mixed with 292 kg of a methylene chloride solution having 10 kg of isophthaloyl dichloride and 10 kg of terephthaloyl dichloride dissolved therein, and the mixture was vigorously stirred to induce the reaction. Then, the organic layer was separated, and washed four times with pure water. Removal of the methylene chloride by evaporation afforded a powdery polymer having a logarithmic viscosity number ($\eta_{inh}$) of 0.70.

Each of the various additives indicated in Table 1 below was added to the powdery polymer in an amount of 0.1% based on the weight of powdery polymer, and they were blended with a supermixer. The blend was sufficiently dried in vacuo, and then formed into chips with an extruder.

The chips were sufficiently dried, and then molded with an injection molding machine to form test samples.

The test samples were exposed for 240 hours to air at 170° C. The changes in the colors and viscosities of the test samples were examined, and the results obtained are shown in Table 1 below.

The molding temperature used for sample preparation was 360° C.

Table 1

| Run | Stabilizer | Treated at 170° C for 240 Hours | | | | High Temperature Residence 80° C and 95% | | Occurrence of Crazing on Treatment for 120 Hours at RH |
| | | Before Treatment | | After Treatment | | | | |
| | | ηinh | Color | ηinh | Color | ηinh | Color | |
| --- | --- | --- | --- | --- | --- | --- | --- | --- |
| Control | None | 0.60 | 7 | 0.55 | 10 | 0.49 | 10 | E |
| 1 | tris-(2-Chloroethyl) phosphate | 0.64 | 3 | 0.61 | 4 | 0.59 | 5 | B |
| 2 | bis-(2-Chloroethyl) phosphate | 0.65 | 3 | 0.63 | 4 | 0.61 | 5 | A |
| 3 | Mono-(2-chloroethyl) phosphate | 0.65 | 3 | 0.63 | 4 | 0.60 | 5 | A |
| 4 | bis-(2-Chloroethyl) phosphate and Mono-(2-chloroethyl) phosphate (mixing weight ratio of 1:1) | 0.67 | 2 | 0.66 | 3 | 0.63 | 4 | A |
| 5 | Dibutyl phosphate | 0.63 | 4 | 0.60 | 5 | 0.58 | 5 | A |
| 6 | Mono-(2-bromoethyl) phosphate | 0.62 | 5 | 0.58 | 6 | 0.53 | 6 | B |
| 7 | Monomethyl phosphate | 0.64 | 3 | 0.60 | 5 | 0.58 | 6 | B |
| 8 | Monoethyl phosphate | 0.65 | 3 | 0.61 | 4 | 0.60 | 4 | B |
| 9 | Triethyl phosphate | 0.64 | 4 | 0.61 | 5 | 0.58 | 5 | B |
| 10 | Ditridecyl phosphate | 0.66 | 5 | 0.57 | 6 | 0.56 | 6 | C |
| 11 | Mono-(2-ethyl hexyl) phosphate | 0.65 | 3 | 0.62 | 4 | 0.62 | 4 | A |
| 12 | Tristearyl phosphate | 0.63 | 4 | 0.57 | 6 | 0.54 | 6 | C |
| 13 | Orthophosphoric acid | 0.62 | 3 | 0.57 | 6 | 0.55 | 6 | C |

It can be seen from the results in Table 1 above that the test samples prepared fom aromatic copolyester compositions containing the phosphorus-containing compounds as stabilizers are superior to the aromatic copolyester not containing a stabilizer (Control) in viscosity reduction and prevention of coloration after treatment, viscosity reduction and prevention of coloration after the high temperature residence test, and prevention of crazing.

Among the phosphate compounds, bis-(2-chloroethyl) phosphate, mono-(2-chloroethyl) phosphate and mono-(2-ethylhexyl) phosphate, were especially superior, and a marked effect was obtained with a 1:1 by weight mixture of bis-(2-chloroethyl) phosphate and mono-(2-choroethyl) phosphate.

EXAMPLE 2

A powder of an aromatic copolyester was obtained in the same manner as in Example 1. To the powder was added a 1:1 (by weight) mixture of bis-(2-chloroethyl) phosphate and mono-(2-chloroethyl) phosphate in an amount of 0.01, 0.1, 0.5, 1.0, 2.0 and 5.0% by weight, respectively. Each of the mixtures was fully dried to a moisture content of less than 0.01%, and made into chips with an extruder. Samples were prepared in the same manner as in Example 1 using an injection molding machine. The test samples were exposed to air at 170° C for 240 hours. The changes in the color and viscosity of the test samples were examined, and the results obtained are shown in Table 2 below.

Table 2

| Run | Amount of a Mixture of bis(2-Chloroethyl) phosphate and Mono-(2-chloroethyl) phosphate (weight ratio 1:1) (wt%) | Before Treatment | | | After Treatment | | |
| | | ηinh | Color | Izod Impact Strength (kg.cm/cm²) | ηinh | Color | Izod Impact Strength (kg.cm/cm²) |
| --- | --- | --- | --- | --- | --- | --- | --- |
| Control | None | 0.60 | 7 | 33 | 0.55 | 10 | 9 |
| 1 | 0.01 | 0.62 | 4 | 35 | 0.58 | 5 | 21 |
| 2 | 0.1 | 0.66 | 2 | 34 | 0.65 | 3 | 30 |
| 3 | 0.5 | 0.66 | 2 | 37 | 0.65 | 3 | 32 |
| 4 | 1.0 | 0.65 | 3 | 31 | 0.62 | 4 | 26 |
| 5* | 2.0 | 0.62 | 4 | 25 | 0.59 | 5 | 16 |
| 6* | 5.0 | 0.59 | 4 | 13 | 0.57 | 5 | 4 |

*Comparative Example

As is clear from the results in Table 2 above, the test samples prepared from aromatic copolyester compositions containing a 1:1 (by weight) mixture of bis-(2-chloroethyl) phosphate and mono-(2-chloroethyl) phosphate are quite superior to the test sample prepared from an aromatic copolyester not containing a stabilizer in preventing viscosity reduction and coloration and in Izod impact strength. A marked difference was seen especially when the amount of the stabilizer added was 0.1 to 0.5% by weight.

EXAMPLE 3

To an aromatic copolyester solution prepared by interfacial polymerization using 5.5 kg of an aqueous sodium hydroxide solution containing 2.75 kg of bisphenol A dissolved therein, 1.21 kg of isophthaloyl dichloride, 1.21 kg of terephthaloyl dichloride, and 25 liters of methylene chloride was added 0.55 liter of a methylene chloride suspension containing 21.0 g of each of a 1:1 (by weight) mixture of di-(2-ethylhexyl) phosphate and mono-(2-ethylhexyl) phosphate and a 1:1 (by weight) mixture of monobutyl phosphate and dibutyl phosphate. The methylene chloride was gradually evaporated off, and the residue was pulverized to form granular aromatic copolyester compositions containing the stabilizers. Each of the aromatic copolyester compositions obtained was fully dried, and test samples were prepared from them in the same manner as in Example 1.

The test samples were each exposed to air at 170° C for 240 hours. Changes in viscosity and color of the test samples were examined and the results obtained are shown in Table 3 below.

Table 3

| Run | Stabilizer | Amount (*) | Before Treatment at 170° C | | | After Treatment at 170° C | | | After Crazing Treatment | | |
|---|---|---|---|---|---|---|---|---|---|---|---|
| | | | $\eta$ inh | Color | Izod Impact Strength (kg.cm/cm²) | $\eta$ inh | Color | Izod Impact Strength (kg.cm/cm²) | $\eta$ inh | Crazing | Izod Impact Strength (kg.cm/cm²) |
| Control | None | 0 | 0.60 | 7 | 32 | 0.55 | 10 | 11 | 0.46 | E | 3 |
| 1 | Di-(2-ethylhexyl) phosphate and Mono-(2-ethylhexyl) phosphate (1:1 by weight mixture) | 0.2 | 0.66 | 2 | 36 | 0.63 | 3 | 30 | 0.60 | A | 33 |
| 2 | Monobutyl phosphate and Dibutyl phosphate (1:1 by weight mixture) | 0.2 | 0.65 | 2 | 34 | 0.64 | 3 | 28 | 0.62 | A | 32 |

(*) Weight % based on the weight of the aromatic copolyester

It is clear from the results in Table 3 above that aromatic copolyester compositions containing a phosphorus-containing compound which were obtained by adding a methylene chloride solution of the phosphorus-containing compound to the solution of the aromatic copolyester also prevented viscosity reduction, coloration, and crazing.

EXAMPLE 4

A powder of an aromatic copolyester was prepared in the same manner as in Example 1. To 80 parts by weight of the powder was added 20 parts by weight of polyethylene terephthalate powder (with a $\eta_{rel}$ of 1.38 as measured in a 5:5 (by weight) mixture of phenol and tetrachloroethane). Further, 0.2 part by weight of a 1:1 (by weight) mixture of di-(2-ethylhexyl) phosphate and mono-(2-ethylhexyl) phosphate was added thereto. The mixture was blended with a supermixer, dried in vacuo at 100° C for 15 hours, and extruded through an extruder at a cylinder temperature of 300° C. Test samples were prepared by molding the resulting chips in an injection molding machine at 320° C in the same manner as in Example 1.

The resulting test samples were exposed for 240 hours to air at 80° C and 95% RH, and changes in appearance and logarithmic viscosity number were examined.

When polyethylene terephthalate was added to the aromatic copolyester, the heat distortion temperature of the composition decreased after ageing at 170° C for 10 days and the sample was distorted. However, in order to maintain consistency with the previous Examples, the ageing was performed under the same conditions as in the previous Examples. The results obtained are shown in Table 4 below.

Table 4

| Run | Polymer Added | Stabilizer | Before Treatment | | After Treatment at 170° C | | Occurrence of Crazing |
|---|---|---|---|---|---|---|---|
| | | | $\eta$inh | Color | $\eta$inh | Color | |
| Control 1 | None | None | 0.59 | 7 | 0.53 | 10 | E |
| Control 2 | Polyethylene terephthalate | None | 0.58 | 6 | 0.51 | 10 | B |
| 1 | " | 1:1 (by weight) mixture of di-(2-ethylhexyl) phosphate and mono-(2-ethylhexyl) phosphate | 0.64 | 1.5 | 0.61 | 2 | A |

The results in Table 4 show that in the case of adding polyethylene terephthalate also, the use of the specified phosphorus-containing compound markedly prevented viscosity reduction, crazing, and coloration as compared with Controls 1 and 2. The joint use of the phosphorus-containing compound in accordance with this invention and polyethylene terephthalate particularly exhibited a better effect in preventing coloration.

EXAMPLE 5

A powder of an aromatic copolyester was prepared in the same manner as in Example 1. To 60 parts by weight of the powder was added 40 parts by weight of polyethylene terephthalate powder (with a $\eta_{rel}$ of 1.38 as measured in a 5:5 (by weight) mixture of phenol and tetrachloroethane). Then, 0.1 part by weight of each of the compounds shown in Table 5 below was added thereto, and the mixture was blended with a supermixer. The mixture was sufficiently dried in vacuo, and extruded into chips using an extruder. The chips were sufficiently dried, and molded with an injection molding machine to form test samples.

The colors and viscosities of the test samples were examined, and the results obtained are shown in Table 5 below.

The molding temperature for sample preparation was 280° C.

Table 5

| Run | Phosphorus-Containing Compound Stabilizer | Test Sample ηinh | Color |
|---|---|---|---|
| Control 1 | None | 0.57 | 7 |
| Control 2 | Trioctyl phosphite | 0.58 | 7 |
| Control 3 | Triphenyl phosphate | 0.57 | 7 |
| 1 | bis-(2-Chloroethyl) phosphate and Mono-(2-Chloroethyl) phosphate, (1:1 (by weight) mixture) | 0.63 | 1.5 |
| 2 | Dibutyl phosphate and Monobutyl phosphate (1:1 (by weight) mixture) | 0.63 | 1.5 |

The results in Table 5 show that in the case of adding polyethylene terephthalate to the aromatic copolyester, the addition of the specified phosphorus-containing stabilizer markedly prevented viscosity reduction and coloration. On the other hand, the use of common phosphorus compounds as a stabilizer as in Controls 2 and 3 did not produce any stabilizing effect for the aromatic copolyester. This confirmed that the phosphorus-containing compounds in accordance with this invention exhibit a marked effect especially in preventing a coloration of the aromatic copolyester.

While the invention has been described in detail and with reference to specific embodiments thereof, it will be apparent to one skilled in the art that various changes and modifications can be made therein without departing from the spirit and scope thereof.

What is claimed is:

1. A resin composition comprising:
(A) an aromatic copolyester produced by polymerization of a substantially equimolar mixture of the monomeric components
   (a) a mixture of (i) terephthalic acid and/or an acid halide, dialkyl ester or diaryl ester thereof and (ii) isophthalic acid and/or an acid halide, dialkyl ester or diaryl ester thereof, with the terephthalic acid unit/isophthalic acid unit mole ratio being about 9:1 to about 1:9, and
   (b) at least one bisphenol of the general formula (I)

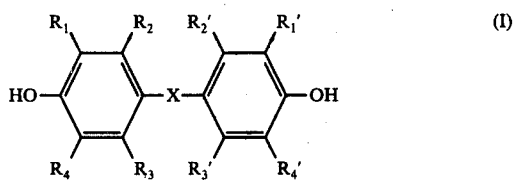

(I)

wherein —X— is selected from the group consisting of —O—, —S—, —SO$_2$—, —SO—, —CO—, an alkylene group containing 1 to 4 carbon atoms or an alkylidene group containing 1 to 4 carbon atoms, and R$_1$, R$_2$, R$_3$, R$_4$, R$_1'$, R$_2'$, R$_3'$ and R$_4'$, which may be the same or different, each is selected from the group consisting of a hydrogen atom, a chlorine atom, a bromine atom or an alkyl group containing 1 to 4 carbon atoms, or a metal salt or diester of said bisphenol of the general formula (I), and
(B) about 0.01 to less than about 2% by weight, based on the aromatic copolyester (A), of a phosphorus-containing compound of the general formula (II)

(II)

wherein n is 0 or an integer of 1 to 3, and R is an alkyl group containing 1 to 18 carbon atoms, in which one or more of the hydrogen atoms of the alkyl group may be replaced by a halogen atom or a hydrocarbon group.

2. The composition of claim 1, wherein the mole ratio of the terephthalic acid unit to the isophthalic acid unit is 7:3 to 3:7.

3. The composition of claim 1, wherein the mole ratio of the terephthalic acid unit to the isophthalic acid unit is 1:1.

4. The composition of claim 1, wherein the phosphorus-containing compound is a compound of formula (II) in which n is an integer of 1 or 2, and R is an alkyl group containing 1 to 10 carbon atoms.

5. The composition of claim 1, wherein the amount of the phosphorus-containing compound is 0.02 to 1% by weight based on the aromatic copolyester (A).

6. The composition of claim 1, wherein the amount of the phosphorus-containing compound is 0.05 to 0.5% by weight based on the aromatic copolyester (A).

7. The composition of claim 1, wherein the bisphenol is 2,2-bis(4'-hydroxyphenyl)propane.

8. The composition of claim 1, wherein the phosphorus-containing compound is bis-(2-chloroethyl) phosphate.

9. The composition of claim 1, wherein the phosphorus-containing compound is mono-(2-chloroethyl) phosphate.

10. The composition of claim 1, wherein the phosphorus-containing compound is a mixture of bis-(2-chloroethyl) phosphate and mono-(2-chloroethyl) phosphate.

11. The composition of claim 1, wherein the phosphorus-containing compound is a mixture of monobutyl phosphate and dibutyl phosphate.

12. The composition of claim 1, wherein the phosphorus-containing compound is a mixture of mono-(2-ethylhexyl) phosphate and di-(2-ethylhexyl) phosphate.

13. The composition of claim 1, wherein said aromatic copolyester (A) is produced by interfacial polymerization, solution polymerization or melt polymerization.

14. The composition of claim 1, wherein said acid halide of terephthalic acid is terephthaloyl dichloride or terephthaloyl dibromide and said acid halide of isophthalic acid is isophthaloyl dichloride or isophthaloyl dibromide.

15. The composition of claim 1, wherein said dialkyl esters of terephthalic acid and isophthalic acid contain 1 to 6 carbon atoms in each alkyl moiety thereof.

16. The composition of claim 1, wherein said diaryl ester of terephthalic acid is diphenyl terephthalate and said diaryl ester of isophthalic acid is diphenyl isophthalate.

17. The composition of claim 1, wherein said metal salt of the bisphenol of the general formula (I) is a sodium salt or a potassium salt.

18. The composition of claim 1, wherein said diester of the bisphenol of the general formula (I) is a diester of the bisphenol with an aliphatic monocarboxylic acid containing 1 to 3 carbon atoms.

19. The composition of claim 1, wherein said phosphorus-containing compound is selected from the group consisting of orthophosphoric acid, monomethyl phosphate, dimethyl phosphate, trimethyl phosphate, monoethyl phosphate, diethyl phosphate, triethyl phosphate, monoisopropyl phosphate, diisopropyl phosphate, triisopropyl phosphate, monopropyl phosphate, dipropyl phosphate, tripropyl phosphate, monobutyl phosphate, dibutyl phosphate, tributyl phosphate, (dibutyl) (monoethyl) phosphate, mono-(2-ethylhexyl) phosphate, di(2-ethylhexyl) phosphate, tri-(2-ethylhexyl) phosphate, monooctyl phosphate, dioctyl phosphate, trioctyl phosphate, monoisodecyl phosphate, diisodecyl phosphate, triisodecyl phosphate, tris-(2,3-dichloropropyl) phosphate, monolauryl phosphate, dilauryl phosphate, trilauryl phosphate, monotridecyl phosphate, ditridecyl phosphate, tris-tridecyl phosphate, monostearyl phosphate, distearyl phosphate, tristearyl phosphate, mono-(2-chloroethyl) phosphate, bis-(2-chloro-ethyl) phosphate, tris-(2-chloroethyl) phosphate, mono(2-bromoethyl) phosphate, bis-(2-bromoethyl) phosphate, tris-(2bromoethyl) phosphate, mono(3-chloropropyl) phosphate, bis-(3-chloropropyl) phosphate, tris-(3-chloropropyl) phosphate, mono-(3-bromopropyl) phosphate, bis-(3-bromopropyl) phosphate, tris-(3-bromopropyl) phosphate, mono-(2-methyl-3-chloropropyl) phosphate, bis-(2-methyl-3-chloropropyl) phosphate, mono-(1,2-dichloroethyl) phosphate, and bis-(1,2-dichloroethyl) phosphate.